(12) United States Patent
Chritz et al.

(10) Patent No.: US 12,487,940 B2
(45) Date of Patent: Dec. 2, 2025

(54) CONFIGURABLE LOGIC BLOCK NETWORKS AND MANAGING COHERENT MEMORY IN THE SAME

(71) Applicant: MICRON TECHNOLOGY, INC., Boise, ID (US)

(72) Inventors: Jeremy Chritz, Seattle, WA (US); David Hulton, Seattle, WA (US)

(73) Assignee: MICRON TECHNOLOGY, INC., Boise, ID (US)

(*) Notice: Subject to any disclaimer, the term of this patent is extended or adjusted under 35 U.S.C. 154(b) by 223 days.

(21) Appl. No.: 17/664,348

(22) Filed: May 20, 2022

(65) Prior Publication Data

US 2022/0276967 A1     Sep. 1, 2022

Related U.S. Application Data

(63) Continuation of application No. 17/068,370, filed on Oct. 12, 2020, now Pat. No. 11,341,057, which is a
(Continued)

(51) Int. Cl.
*G06F 12/10* (2016.01)
*G06F 3/06* (2006.01)

(52) U.S. Cl.
CPC .......... *G06F 12/10* (2013.01); *G06F 3/0604* (2013.01); *G06F 3/0659* (2013.01);
(Continued)

(58) Field of Classification Search
CPC .......... G06F 12/10; G06F 2212/1044; G06F 2212/657; G06F 3/0604; G06F 3/0659;
(Continued)

(56) References Cited

U.S. PATENT DOCUMENTS

| 10,942,861 B2 | 3/2021 | Chritz et al. |
| 11,341,057 B2 | 5/2022 | Chritz et al. |

(Continued)

OTHER PUBLICATIONS

"An Introduction to CCIX White Paper", CCIX Seamless Acceleration, Jul. 30, 2018, pp. 1-10.
(Continued)

*Primary Examiner* — Jane W Benner
(74) *Attorney, Agent, or Firm* — Dorsey & Whitney LLP (57) ABSTRACT

Apparatuses and methods for managing a coherent memory are described. These may include one or more algorithmic logic units (ALUs) and an input/output (IO) interface. The I/O interface may receive one or more commands and retrieve data from or write data to a memory device. Each command may contain a memory address portion associated with a memory device. The apparatus may also include a memory mapping unit and a device controller. The memory mapping unit may map the memory address to a memory portion of the memory device, and the device controller may communicate with the memory device to retrieve data from or write data to the memory device. The apparatus may be implemented as a processing element in a configurable logic block network, which may additionally include a control logic unit that receives programming instructions from an application and generate the one or more commands based on the instructions.

22 Claims, 7 Drawing Sheets

Related U.S. Application Data continuation of application No. 16/049,269, filed on Jul. 30, 2018, now Pat. No. 10,942,861.

(52) U.S. Cl.
CPC .... *G06F 3/0683* (2013.01); *G06F 2212/1044* (2013.01); *G06F 2212/657* (2013.01)

(58) Field of Classification Search
CPC ............... G06F 3/0683; G06F 13/1663; G06F 2212/1024; G06F 3/061; G06F 3/0661; G06F 3/0688; G06F 3/167
See application file for complete search history.

(56) References Cited

U.S. PATENT DOCUMENTS

| | | | |
|---|---|---|---|
| 2006/0059484 A1 | 3/2006 | Selvaggi et al. | |
| 2012/0069035 A1* | 3/2012 | Bourd | G06F 9/54 345/557 |
| 2012/0216012 A1* | 8/2012 | Vorbach | G06F 9/3888 712/E9.003 |
| 2014/0359044 A1 | 12/2014 | Davis et al. | |
| 2015/0278100 A1* | 10/2015 | Sundaram | G06F 9/3836 711/137 |
| 2016/0085706 A1 | 3/2016 | Deshpande et al. | |
| 2018/0189230 A1 | 7/2018 | Cargnini et al. | |
| 2019/0220424 A1* | 7/2019 | Guim Bernat | G06F 12/0831 |
| 2019/0377580 A1* | 12/2019 | Vorbach | G06F 9/30123 |
| 2020/0034309 A1 | 1/2020 | Chritz et al. | |
| 2021/0026779 A1 | 1/2021 | Chritz et al. | |

OTHER PUBLICATIONS

U.S. Appl. No. 17/068,370 titled "Configurable Logic Block Networks and Managing Coherent Memory in the Same" filed Oct. 12, 2020, pp. all pages of application as filed.

U.S. Appl. No. 16/049,269 titled "Configurable Logic Block Networks and Managing Coherent Memory in the Same" filed Jul. 30, 2018, pp. all pages of application as filed.

Brad Benton "CCIX, Gen-Z, Opencapi: Overview & Comparison", Open Fabrics Alliance, Mar. 2017, pp. all.

* cited by examiner

CONFIGURABLE LOGIC BLOCK NETWORKS AND MANAGING COHERENT MEMORY IN THE SAME

CROSS REFERENCE TO RELATED APPLICATION(S)

This application is a continuation of U.S. patent application Ser. No. 17/068,370 filed Oct. 12, 2020 and issued as U.S. Pat. No. 11,341,057 on May 24, 2022, which is a continuation of U.S. application Ser. No. 16/049,269 filed Jul. 30, 2018 and issued as U.S. Pat. No. 10,942,861 on Mar. 9, 2021. The aforementioned applications, and issued patents, are incorporated herein by reference, in their entirety, for any purpose.

TECHNICAL FIELD

The present disclosure is related to configurable logic units and examples of managing coherent memory in a configurable logic block network are described.

BACKGROUND

Many processing architectures exist to accomplish extensive computations such as machine learning and artificial intelligence tasks. For example, data computations may be implemented using hardware computing platforms, such as an integrated circuit (IC), an application-specific integrated circuit (ASIC), a digital signal processor (DSP) implemented as part of a field-programmable gate array (FPGA), or a system-on-chip (SoC). These hardware platforms may include configurable logic units having digital signal processing (DSP) capabilities, such as adders, multipliers, and other arithmetic logic units (ALUs) utilized in combination. The computations implemented in these hardware computing platforms may be executed in various applications. For example, digital signal processing for wireless communications, such as digital baseband processing or digital front-end implementations, may be implemented using the hardware computing platforms. Multimedia processing, such as streaming, and digital radio frequency (RF) processing over the wireless network, such as the "fifth generation" (5G) systems, are also among the applications that may be implemented in hardware computing platforms. In some implementations of 5G wireless communications, "Internet of Things" (IoT) devices may operate on a narrowband wireless communication standard, which may be referred to as Narrow Band IoT (NB-IoT).

All of these applications mentioned above may require extensive computations on both software and hardware platforms and often require frequent data transfers across different devices or across the network. For example, a processing element in a configurable logic block may require data in the operands to be transferred and stored in a local memory before the data can be processed. In another example, a co-processor may be coupled to a processor by a bus or an interconnect, such as Peripheral Component Interconnect Express (PCIe). As such, computations implemented on hardware platforms are limited to the resources associated with the hardware, such as the bandwidth of the bus or interconnect, or the network latency.

DETAILED DESCRIPTION

Memory devices may generally include any electronic device that holds data. The memory device may be a memory inside an integrated circuit, a storage device or any electronic device that has a memory or storage, such as a direct memory access (DMA)-compliant memory, double data rate (DDR) memory, a hardware management system, an accelerator, or a co-processor, etc. The memory device may also be a portable memory device such as a non-transitory storage medium, a mobile phone. The memory device may also be computing platform having memory thereon. The memory devices described herein may solve the problems described herein via a coherent shared memory device that leverages various memory types that may be coupled with one another via a reconfigurable fabric that includes configurable logic blocks.

Figure 1:
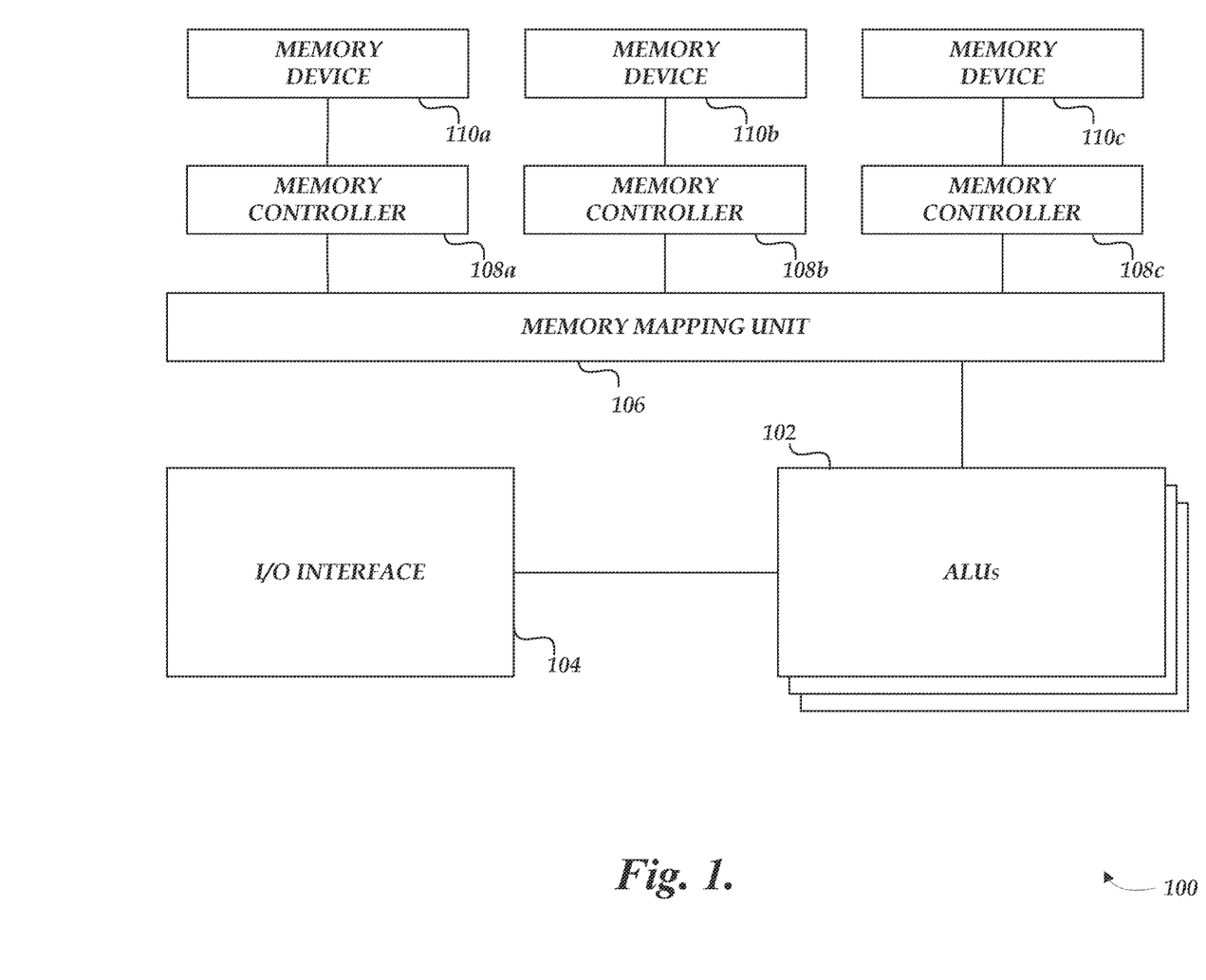
FIGS. 1-2 are block diagrams of examples of apparatuses of a computing system in accordance with various examples described in the present disclosure.

FIG. 1 is a block diagram of an apparatus arranged in accordance with examples described herein. Apparatus 100 may include one or more algorithmic logic units (ALUs) 102 configured to perform algorithmic operations. Each of the ALUs 102 may be a logic gate, such as a NAND, an AND, an OR, or a XOR gate. ALUs 102 may also be a logic circuit configured to receive one or more operands and implement certain operand operations, such as a bit manipulation unit, a multiplication unit, an accumulation unit, an adder unit, a look-up table unit, a memory look-up unit, or any combination thereof. In some examples, ALUs 102 may include a circuitry, a custom circuitry, and/or firmware for performing functions described herein. For example, the circuitry can include multiplication unit/accumulation units for performing the functions, as described herein. In some scenarios, ALUs 102 may be implemented in a microprocessor or a digital signal processor (DSP), or any combination thereof. The microcontroller or micro-processor may be configured to execute programming instructions, which, when executed by the processing device, will cause the ALUs to perform certain operations. Apparatus 100 may include a memory (not shown) to store the programming instructions.

Apparatus 100 may also include input/output (I/O) interface 104 configured to retrieve data from or write data to any of the memory devices 110a-110c. For example, a read or write command may contain at least information about which memory device and a memory address portion associated with the memory device at which the data is to be read or written.

Apparatus 100 may also include one or more memory controllers 108a-108c, each of which is coupled to a memory device 110a-110c, respectively. Each memory controller 108a-108c may be configured to provide the control signals for each corresponding memory device 110a-110c, such as read/write commands or data strobe signals, memory addresses associated with each corresponding device, and/or data to be stored in the memory device. The memory device 110a-110c may be internal or external to apparatus 100 accessing the memory device. For example, the memory device may be residing inside the same integrated circuit with apparatus 100. Alternatively, the memory device may be external to apparatus 100.

Apparatus 100 may also include a memory mapping unit 106 that is coupled to the one or more ALUs 102 and the memory controller 108a-108c. The memory mapping unit 106 may be configured to map the memory address portion in the read/write commands to a physical memory portion of the memory device. This allows apparatus 100 to communicate with the memory device 110a-110c to retrieve data from or write data to the physical memory portion of the memory device. As such, a memory may become a shared coherent memory that would allow the apparatus to easily access data or support high bandwidth applications without having to store a local copy of data. Details of these features and advantages are further described as below by way of various examples.

Figure 2:
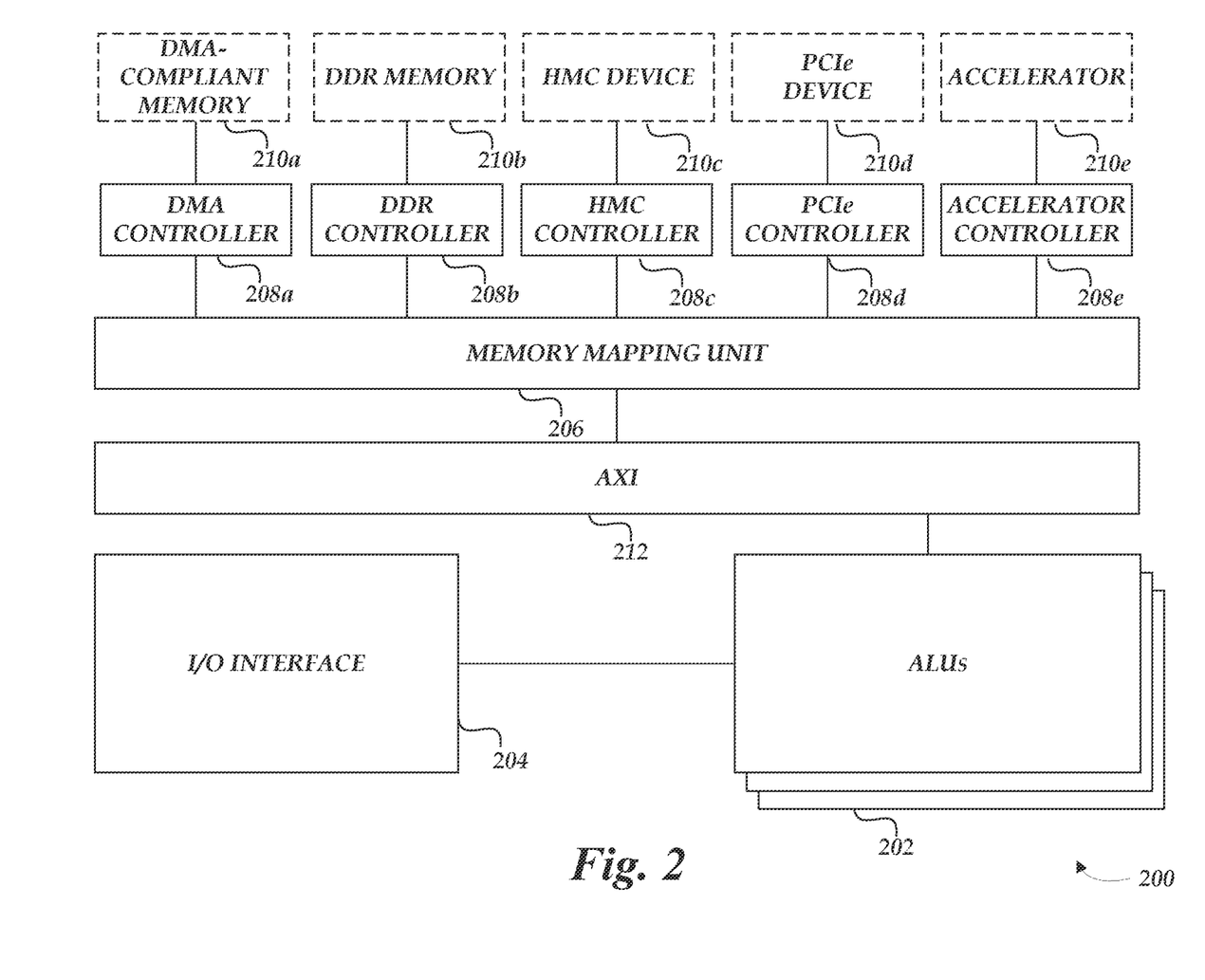

In FIG. 2, in some examples, apparatus 200 may include similar structure and functionalities as those of apparatus 100 in FIG. 1. For example, apparatus 200 may include one or more ALUs 202, an I/O interface 204 coupled to the one or more ALUs 202 and configured to receive one or more commands and retrieve data from or write data to a memory device. Each command may contain at least a memory address portion associated with the memory device. Apparatus 200 may also include a memory mapping unit 206 coupled to the ALUs 202 and configured to map the memory address portion to a physical memory portion of the memory device. The memory mapping unit may variously be implemented as a chiplet, an element of a system on chip (SoC), an application-specific integrated circuit (ASIC), or the like. In some scenarios, the memory device may be one of a DMA-compliant memory 210a, a DDR memory 210b, a hybrid memory cube (HMC) device 210c, a PCIe device 210d, an accelerator 210e, or any other memory device.

Apparatus 200 may also include one or more memory controllers 208a-208e coupled to the memory mapping unit 206 and configured to communicate with any of the memory devices 210a-210e to retrieve data from or write data to the memory device. Each of the memory controllers 208a-208e may be coupled to a corresponding memory device. Additionally, apparatus 200 may include an advanced extensible interface (AXI) 212 coupled to the ALUs 202 and the memory mapping unit. AXI 212 may be configured to receive output data streams from the ALUs 202 and convert the data streams to AXI write transaction data to one or more memory devices 210a-210e. For example, apparatus 200 may include a DMA engine (not shown) that converts output streaming data from ALUs 202 to AXI write transactions. The DMA engine may be residing in the AXI or may be external to the AXI. AXI 212 may also be configured to retrieve data from the memory devices 210a-210e in the form of AXI read data and convert the retrieved data to input data streams for the ALUs 202.

In some scenarios, memory mapping unit 206 may receive AX write transactions and determine which memory to access based on the AXI write request, for example, HMC, DDR, PCIe, etc. In a non-limiting example, an AXI transaction (write or read) may include an address that may indicate the memory (e.g., HMC, DDR, PCIe) and the location of data in the memory. When reading data from a memory, memory mapping unit 206 may determine a memory address from an AXI read request, provide an address to the memory device and wait to read data from the memory device, and align the read data with that AXI read request. When writing data to a memory, memory mapping unit 206 may determine a memory address and write data from the AXI write request, provide an address to the memory device and write data to the memory device.

The above illustrated solution may allow data transfer across various devices in a memory operation, which may reduce the latency associated with accessing attached physical devices in some examples. For example, with the memory mapping unit implemented in each apparatus, data access across processors, accelerators, memory, and other attached devices may become coherent in that data access can be operated as an operation of accessing a shared memory from any attached device based on virtual addresses. This solution may be implemented in various configurations, examples of which are described herein.

Figure 3:
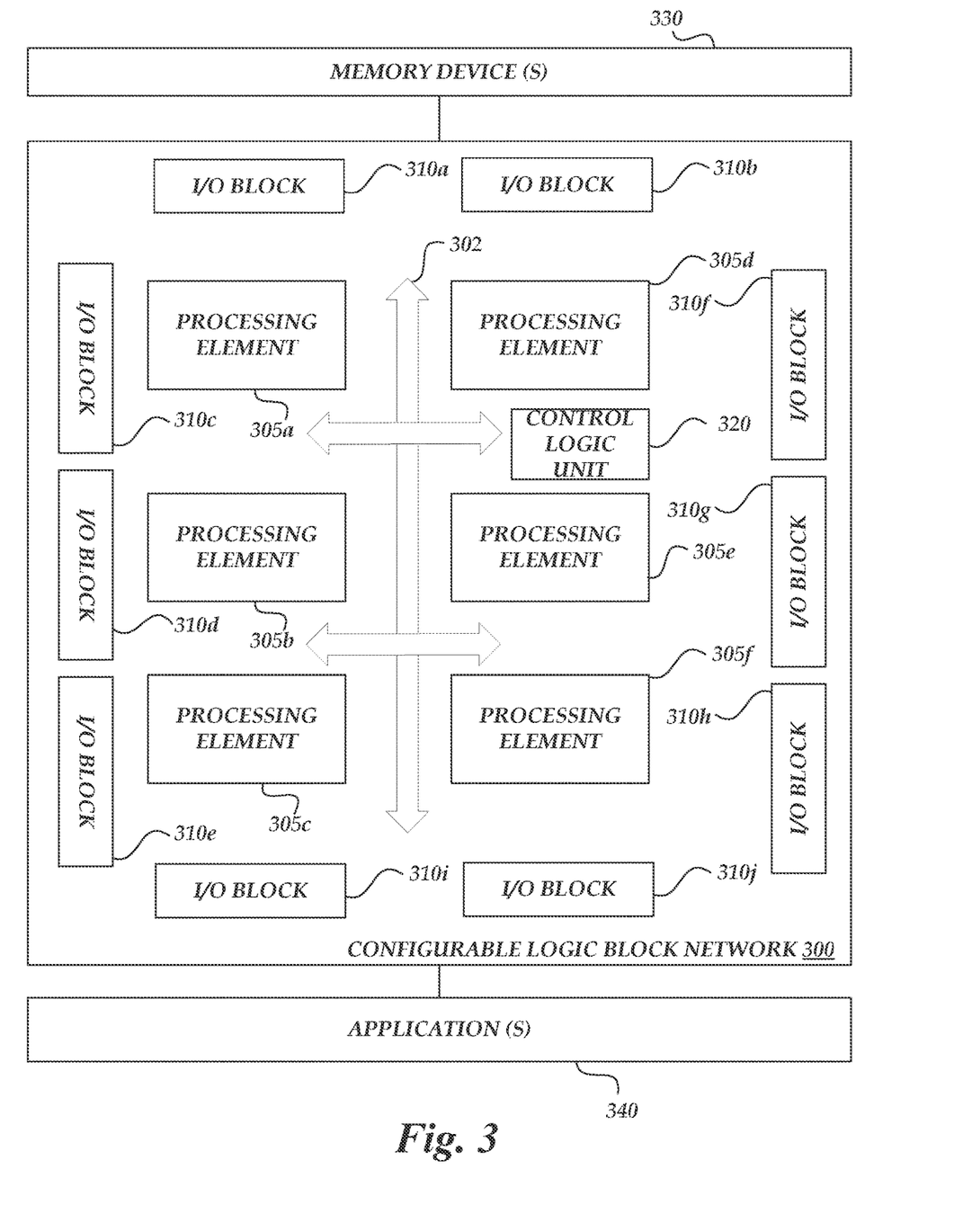
FIG. 3 is a block diagram of an example of a configurable logic block network in accordance with various examples in the present disclosure.

In FIG. 3, the apparatus described in the examples in FIGS. 1 and 2 may be implemented in a processing element in a configurable logic block network apparatus 300. In some scenarios, apparatus 300 may include an interconnect 302, with processing elements 305a-305f, I/O blocks 310a-310j, and control logic unit 320 coupled thereto. While only six processing elements 305a-305f and ten I/O blocks 310a-310j are depicted in FIG. 3, it can be appreciated that apparatus 300 may include any suitable number of processing elements and I/O blocks. Apparatus 300 may cascade processing elements 305a-305f together such that a processing element 305a-305f may have access to any other processing element in the network. Apparatus 300 may also be coupled to one or more memory devices 330. The control logic unit 320 may be coupled to the interconnect 302 and configured to generate the one or more commands for each of the plurality of processing elements 305a-305j based on one or more instructions. One or more apparatuses 300 may be implemented in an IC, an ASIC, a DSP a FPGA, or a SoC.

Each of the processing elements 305a-305j may have similar structures and functionalities as those depicted with reference to FIGS. 1-2. In some scenarios, a processing element may have one or more ALUs and an I/O interface coupled to the one or more ALUs. The I/O interface may be configured to receive one or more commands and retrieve data from or write data to a memory device, each containing at least a memory address portion associated with the memory device(s). The processing element may also have a memory mapping unit coupled to the one or more ALU in that processing element and configured to map the memory address portion in a command to a physical memory portion of the memory device(s).

A processing element 305a-305f may be implemented using a programmable logic block, or a logic circuit comprising one or more logic units, such as one or more NAND gates. The processing elements 305a-305f may be cascaded across logical rows and columns with I/O blocks 310a-310j bounding respective rows and columns for connections external to the apparatus 300. The processing elements 305a-305f may implement a DSP slice that performs DSP operations. Control logic unit 320 may include instruction sets (e.g., one or more programming instructions or operations) to be performed by the processing elements 305a-305f. Control logic unit 320 may include, for example, computer software, hardware, firmware, or a combination thereof configured to provide instruction sets to the processing elements 305a-305f. For example, the instruction sets may include instructions to perform certain logic or arithmetic operations on data, transmit data from one processing element 305a-305f to another processing element 305a-305f, or perform other operations.

In some examples, control logic unit 320 may retrieve instructions via I/O blocks 310a-310j for the processing elements 305a-305f from one or more memories, such as a volatile (e.g., dynamic random access memory (DRAM)) or non-volatile memory (e.g., Flash memory, phase change memory, 3D XPoint™, or the like). The instruction sets may be stored in one or more data structures, such as a database. Control logic unit 320 may be configured to receive programming instructions from application(s) 340 and generate one or more commands and provide control signals to various circuits, such as those depicted in FIGS. 1 and 2. For example, responsive to receiving programming instructions from an application 340 via an I/O block 310a-310j, the control logic unit 320 may provide control signals to control the processing elements 305a-305f to perform one or more operations and/or access (e.g., read, write, program) a memory portion of a memory device. Control logic unit may also determine as to whether a common operand is to be provided to a particular processing element 305a-305f for an operation including a common operand. Details of providing the control signals by the control logic are further described with reference to FIGS. 4-5.

Figure 4:
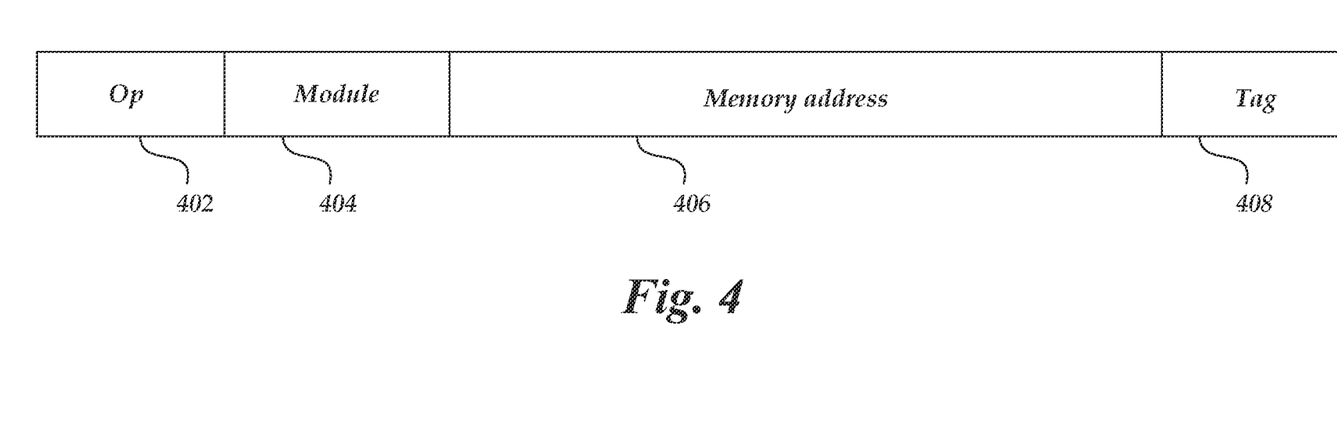
FIG. 4 shows an example of a message format in a network command.

In FIG. 4, an example of a message format of a command for controlling one or more processing elements is illustrated. For example, a command may include: a portion 402 containing the type of operation to be performed by a processing element; a portion 404 containing a module number that indicates which processing element is to perform the operation; a portion 406 containing a memory address and a portion 408 containing a tag. Each portion of the command may include any suitable number of bits. For example, based on the programming instructions received from the application, the control logic unit 320 (in FIG. 3) may determine an operation to be performed by a processing element. The operation may be any operation that can be performed by a processing element, such as a bit manipulation unit, a multiplication unit, an accumulation unit, an adder unit, a look-up table unit, a memory look-up unit, or any combination thereof. Each of these operations, or a combination thereof, may be represented by an operation type code, such as, for example, a 2-bit, 4-bit, or 8-bit number.

With further reference to FIG. 4, the module number 404 in the command indicates which processing element in the configurable logic block network (300 in FIG. 3) is to perform the operation indicated by the operation number 402. Each processing element in the network may be addressable by the interconnect, for example, by row and column. In such a case, the module number will contain row and column information.

In performing an operation, each processing element may need one or more operands, which can be contained in one or more programming instructions and subsequently in one or more commands generated by the control logic unit. Additionally, or alternatively, the processing element may need to access data at a memory location in any memory device (330 in FIG. 3, 210a-210e in FIG. 2, 110a-110c in FIG. 1). The memory device may be located inside the configurable logic block network or external to the network, as an attached device. Memory address 406 in the command may include the location of the memory portion that contains the data in the memory device, for example, the row and column of the memory. Additionally, the memory address 406 may also contain information about the source of the memory device, the source may include device number, network address of each memory device, or row and column address of the memory in a memory array. The tag 408 may contain other additional information associated with the memory. In some non-limiting examples, memories like HMC and PCIe allow out of order packets, and tag 408 may contain information that indicates the order of packets from a read operation. The memory mapping device may align out of order packets using tag information. For example, data that contains packets 1, 2 and 3 is read from a HMC memory as packets 3, 1 and 2 stored in the tag field. The memory mapping unit may read the tag information from the tag field 408 and temporarily store the out of order data in a local memory, e.g., a RAM. For example, upon receiving packet 3, the device may temporarily store packet 3 in the local memory, until receiving packets 1 and 2. At that time, the device may re-arrange the data in order according to tag information.

Figure 5:
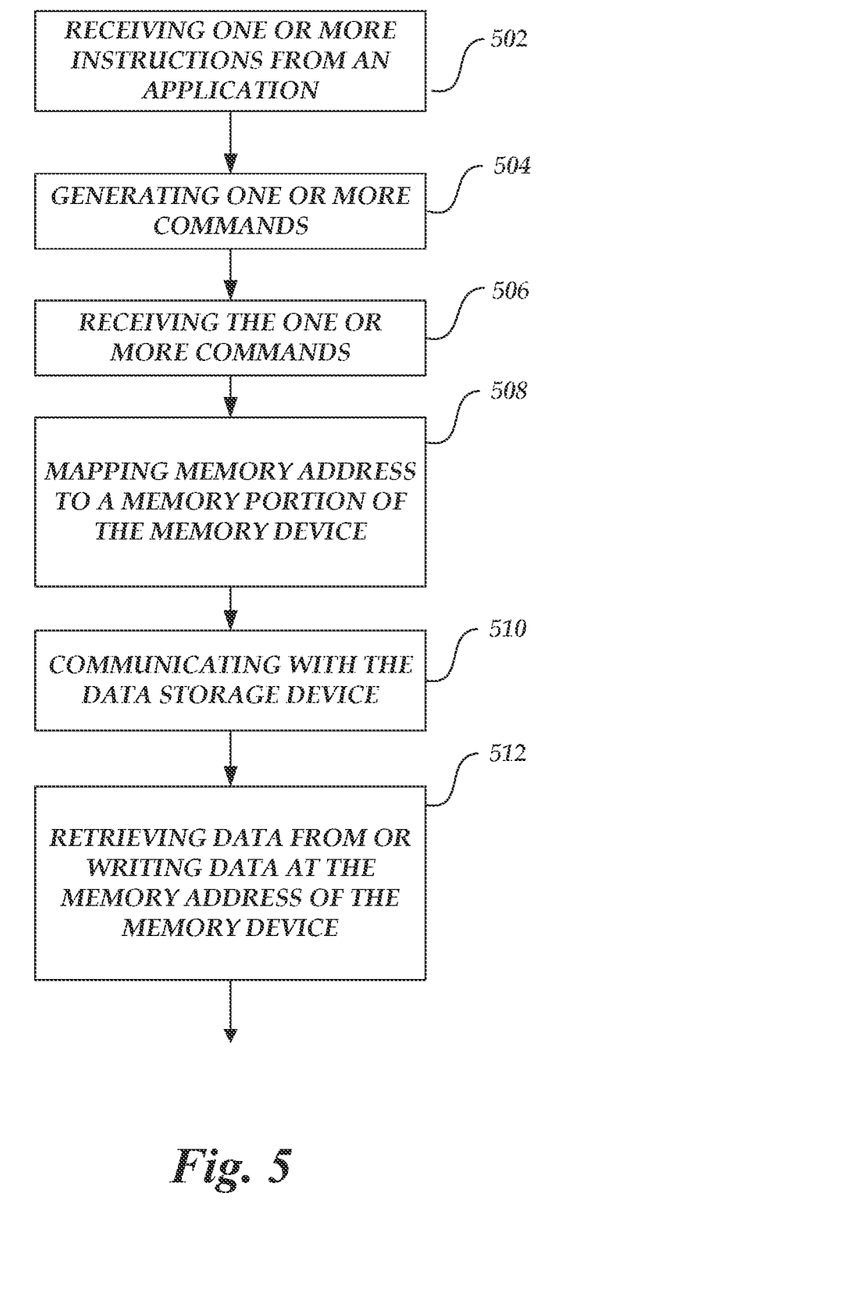
FIG. 5 is a flow diagram of an example of a process for processing one or more instructions in accordance with various examples in the present disclosure.

Various methods can be implemented in above illustrated embodiments in FIGS. 1-4. In FIG. 5, in accessing a coherent memory space, a method may include receiving one or more programming instructions from an application 502. For example, a control logic unit of a configurable logic block network may receive the programming instructions from the application via one or more I/O blocks of the network. The I/O blocks may be a communication peripheral or interface that uses any of the wired or wireless communication link. Alternatively, the I/O blocks may also use any suitable data transfer peripherals and protocols, such as serial, parallel, twisted pair, USB, USB-C, lightening cable, or other protocols.

The method may also include generating one or more commands 504 for at least one of a plurality of processing elements based on the one or more instructions. This step may be done by the control logic (e.g., 320 in FIG. 3) of the configurable logic block network. Further, the method may include receiving the one or more commands 506 by at least one processing element in the network. The one or more commands may include information containing the type of operation, module number, memory address, and/or associated tags, as depicted in FIG. 4. The method may further include mapping the memory address portion in the command to a physical memory portion of the memory device 508. This step can be done by a memory mapping unit of the processing element. The method may further include retrieving data from or writing data at the memory portion of the memory device 512.

The above illustrated method, once implemented in the described apparatuses and network may be implemented using various configurations that may advantageously use coherent and shared memory to achieve improved (e.g., optimal) performance in terms of network latency. In some examples, returning to FIG. 2, a configurable logic block network may include multiple memory devices interconnected with each of the processing element. Whereas an HMC device may not have bandwidth to support machine learning tasks, various HMC devices may be interacting with one or more processing elements and used as shared memories for machine learning tasks, which require frequent update of a common operand or variable as it proceeds through a machine learning algorithm. Each of these HMC devices may be accessed by any processing element through the memory mapping unit and the corresponding memory controller in each corresponding processing element.

In some examples, in a network application, where a network layer processing result would generally be sent to a local memory, which causes latency, processing for each network layer may be allocated to respective single processing elements. The aggregate results of each layer can be processed in the shared, coherent memory space, before moving into the next layer. This solution may result in retrieving the processing results more quickly from the shared memory space, rather than retrieving the same, common operand from a local memory specific to a processing element. For example, in a neural network framework implementing an artificial intelligence task, each processing unit in a configurable logic block network may be dedicated to processing a particular layer in the neural network, e.g., a convolutional neural network (CNN), and the results in each convoluted layer in the CNN can be shared and propagated to the next layer quickly. Multiple layers may also be implemented in parallel while sharing the results of each layer in a common shared memory space.

With continued reference to FIG. 2, the use of HMC controller 208c allows the data streams from an HMC device 210c to communicate with a specific cluster (e.g., one or more processing elements) of the configurable logic block network (300 in FIG. 3). In one implementation, the one or more programming instructions can be scripts that are buffered in the network. For example, the scripts, when executed by one or more processing elements in the network, may cause one or more processing elements to direct data from a first HMC device to a first processing element and direct data from a second HMC device to a second processing element in the same network. In other examples, data retrieved from one HMC device may be directed to a first processing element, the result from which is further directed to a second processing element, achieving the pipelining effect. As HMC devices are normally connected to a processing device via an interface, such as PCIe that has limited bandwidth, the above illustrated configuration achieves faster processing time and lower latency.

Optionally, apparatus 200 in FIG. 2 also has a PCIe controller 208d that will retrieve data from a PCIe device 210d for interoperability to other PCIe compatible devices.

While networks based on traditional network protocols, e.g. PCIe, may have a lower data bandwidth associated with the protocol, the aforementioned embodiments with reference of FIGS. 1-5 can be configured to form a hostless system that optimizes data transfer among devices. For example, with AXI (212 in FIG. 2) built in together with the ALUs 202 and implemented in a network (e.g., 300 in FIG. 3), a system may be configured to operate in an ad-hoc network and make decisions as to where data resources will be utilized, rather than having a host system to arbitrate data flow and make that decision. The configuration of the system may be done by incorporating the software stack and data movement functionalities, to be implemented, for example, in the control logic unit (320 in FIG. 3). For example, in handling a call in a telecommunication network, a configurable logic block network may determine that certain processing elements (a cluster) will process Bluetooth applications, while allocating additional processing elements (another cluster) on the same configurable logic block network to handle WiFi communications (e.g., a call center processing application), thereby handling all calls in one chip, eliminating the interface and associated latency as in a traditional host architecture.

In other examples, while a conventional host system that might be limited by the PCIe link may decide whether to allocate further processing resources to certain time-sensitive tasks, examples of configurable logic block networks described herein may be configured to receive a request for processing time-sensitive tasks from the host system and allocate certain processing elements to process time-sensitive tasks that optimize for a latency factor.

In some scenarios, the above illustrated embodiments with reference to FIGS. 1-5 can also be formed to utilize aspects of a master-slave configuration. For example, a local 5G telecommunication system may include multiple interconnected identical clone devices, each implementing the aforementioned configurable logic block network (e.g., 300 in FIG. 3). The system may identify one of the clone devices as master resources for which master functionalities may be provided. This can be done by passing a "master token" (e.g., implemented by a token passing algorithm) that cause a particular device to be allocated or assigned master aspects or functionalities. In some implementations, a clone device operating as the master device may dynamically reconfigure its own resources (e.g. processing elements) or resources of another clone device based on optimization factors for the telecommunication network.

In an example of a mesh network, a "master" device may allocate communication flows in the mesh network, while one clone device may communicate to a nearest node (e.g., a node with one or more clone devices) at a high frequency for high data transfer. At the same time, other nodes may communicate lower bandwidth information to more distant nodes to get the data to the destination, without pipelining the data behind the high data transfer process.

Figure 6:
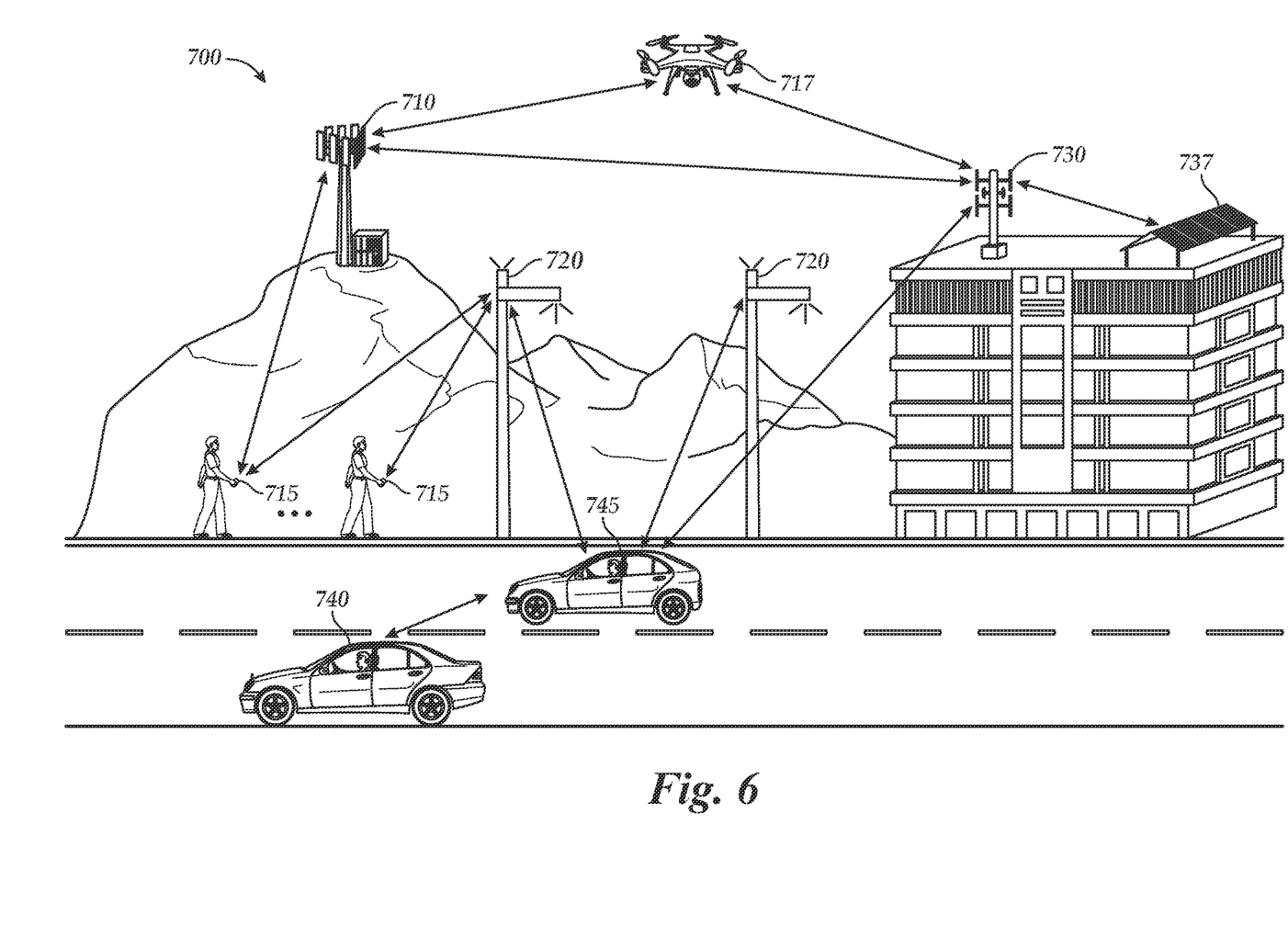
FIGS. 6-7 are block diagrams of wireless communications systems arranged in accordance with some aspects of the present disclosure.

FIG. 6 illustrates an example of a wireless communications system 700 in accordance with some aspects of the present disclosure. The wireless communications system 700 includes a base station 710, a mobile device 715, a drone 717, a small cell 730, and vehicles 740, 745. Base station 710 and small cell 730 may be connected to a network that provides access to the Internet and traditional communication links. System 700 may facilitate a wide-range of wireless communications connections in a 5G wireless system that may include various frequency bands, including but not limited to: a sub-6 GHz band (e.g., 700 MHz communication frequency), mid-range communication bands (e.g., 2.4 GHz), and mmWave bands (e.g., 24 GHz).

Additionally or alternatively, the wireless communication connections may support various modulation schemes, including but not limited to: filter bank multi-carrier (FBMC), the generalized frequency division multiplexing (GFDM), universal filtered multi-carrier (UFMC) transmission, bi-orthogonal frequency division multiplexing (BFDM), sparse code multiple access (SCMA), non-orthogonal multiple access (NOMA), multi-user shared access (MUSA), and faster-than-Nyquist (FTN) signaling with time-frequency packing. Such frequency bands and modulation techniques may be a part of a standards framework, such as Long Term Evolution (LTE) or other technical specifications published by an organization like 3GPP or IEEE, which may include various specifications for subcarrier frequency ranges, a number of subcarriers, uplink/downlink transmission speeds, TDD/FDD, and/or other aspects of wireless communication protocols.

System 700 may depict aspects of a radio access network (RAN), and system 700 may be in communication with or include a core network (not shown). The core network may include one or more serving gateways, mobility management entities, home subscriber servers, and packet data gateways. The core network may facilitate user and control plane links to mobile devices via the RAN, and it may be an interface to an external network (e.g., the Internet). Base stations 710, communication devices 720, and small cells 730 may be coupled with the core network or with one another, or both, via wired or wireless backhaul links (e.g., S1 interface, X2 interface, etc.).

System 700 may provide communication links connected to devices or "things," such as sensor devices, e.g., solar cells 737, to provide an Internet of Things ("IoT") framework. Connected things within the IoT may operate within frequency bands licensed to and controlled by cellular network service providers, or such devices or things may. Such frequency bands and operation may be referred to as narrowband IoT (NB-IoT) because the frequency bands allocated for IoT operation may be small or narrow relative to the overall system bandwidth. Frequency bands allocated for NB-IoT may have bandwidths of 50, 100, or 200 KHz, for example.

Additionally or alternatively, the IoT may include devices or things operating at different frequencies than traditional cellular technology to facilitate use of the wireless spectrum. For example, an IoT framework may allow multiple devices in system 700 to operate at a sub-6 GHz band or other industrial, scientific, and medical (ISM) radio bands where devices may operate on a shared spectrum for unlicensed uses. The sub-6 GHz band may also be characterized as and may also be characterized as an NB-IoT band. For example, in operating at low frequency ranges, devices providing sensor data for "things," such as solar cells 737, may utilize less energy, resulting in power-efficiency and may utilize less complex signaling frameworks, such that devices may transmit asynchronously on that sub-6 GHz band. The sub-6 GHz band may support a wide variety of uses case, including the communication of sensor data from various sensors devices. Examples of sensor devices include sensors for detecting energy, heat, light, vibration, biological signals (e.g., pulse, EEG, EKG, heart rate, respiratory rate, blood pressure), distance, speed, acceleration, or combinations thereof. Sensor devices may be deployed on buildings, individuals, and/or in other locations in the environment. The sensor devices may communicate with one another and with computing systems which may aggregate and/or analyze the data provided from one or multiple sensor devices in the environment. Such data may be used to indicate an environmental characteristic of the sensor.

In such a 5G framework, devices may perform functionalities performed by base stations in other mobile networks (e.g., UMTS or LTE), such as forming a connection or managing mobility operations between nodes (e.g., handoff or reselection). Devices may also have coherent shared memory space, where each device may comply a bus/interconnect standard, such as Cache Coherent Interconnect for Accelerators (CCIX). Under CCIX, each of the processing elements (e.g., 305a-305f in FIG. 3) and each of the memory devices (e.g., 110a-110c in FIG. 1, 210a-210e in FIG. 2) may have a CCIX "wrapper" that allows such device to share a coherent memory space in any other CCIX-compliant device.

In some examples, mobile device 715 may receive sensor data from the user utilizing the mobile device 715, such as blood pressure data. Instead of transmitting that sensor data to base station 710 on a narrowband IoT frequency band, the sensor data may reside in the mobile device in a coherent memory space that can be accessed by any processing element on a computing system. With reference to FIG. 3, the mobile device may be one of the memory devices (330) that can be accessed by a configurable logic block network 300, all of which may be CCIX-compliant devices or devices that comply with other standards such as the standard defined by Gen-Z Consortium.

Additionally or alternatively, mobile device 715 may form device-to-device (D2D) connections with other mobile devices or other elements of the system 700 and share its memory space to other mobile devices and other elements of the system. For example, mobile device 715 may form RFID, WiFi, MulteFire, Bluetooth, or Zigbee connections with other devices, including communication device 720 or vehicle 745. Data transfer between these devices can use one of the standards mentioned above such as CCIX, Gen-Z, or other standards. When the system is implemented in aforementioned embodiment with reference to FIGS. 1-5, devices may share a coherent memory space, eliminating the need for transferring sensor data on each mobile device to a local memory of another device.

Returning to the example in FIG. 6, vehicles 740, 745 may share real-time directional and navigation data with each other over the coherent memory space while the vehicles 740, 745 are connected via the base station 710 or through a D2D connection. For example, a D2D connection between the vehicles 740, 745 may be established when the two vehicles are passing each other across a narrow intersection line. Each vehicle 740, 745 may be tracking the intersection line and providing image data to an image processing algorithm to facilitate autonomous navigation of each vehicle while each vehicle travels along the intersection line.

In various examples, the elements of wireless communication system 700, such as drone 717 and solar cells 737, may be implemented utilizing the systems, apparatuses, and methods described herein with reference to FIGS. 1-5. For example, the configurable logic block network (300 in FIG. 3) may be implemented in a server device in the system or at base station 710. Drone 717 may include a sensor to detect various aerodynamic properties of the drone 717 traveling through the air space. For example, the drone 717 may include sensors to detect wind direction, airspeed, or any other sensor generally included vehicles with aerodynamic properties. These sensor data may be stored locally on drone 717. An application that utilizes the drone sensor data may request such sensor data from the apparatus 300 (in FIG. 3), which allocates one or more processing elements in the system to communicate with the drone and retrieve such date. In such a case, drone 717 may be an attached device to the system 700 as one or the memory device(s) 330 (FIG. 3), and the control logic unit 320 (FIG. 3) may generate one or more commands to access the memory portion of the drone by providing a memory address that points to the physical memory portion in drone 717 that stores captured sensor data.

In some examples, the solar cells 737, being implemented as another attached device (i.e., memory device 330 in FIG. 3), may include a photoelectric sensor to detect light on the solar cells 737. The solar cells 737 may provide access to that sensor data to any processing element or cluster in the system in a memory operation as previously described with reference to FIGS. 1-5.

Figure 7:
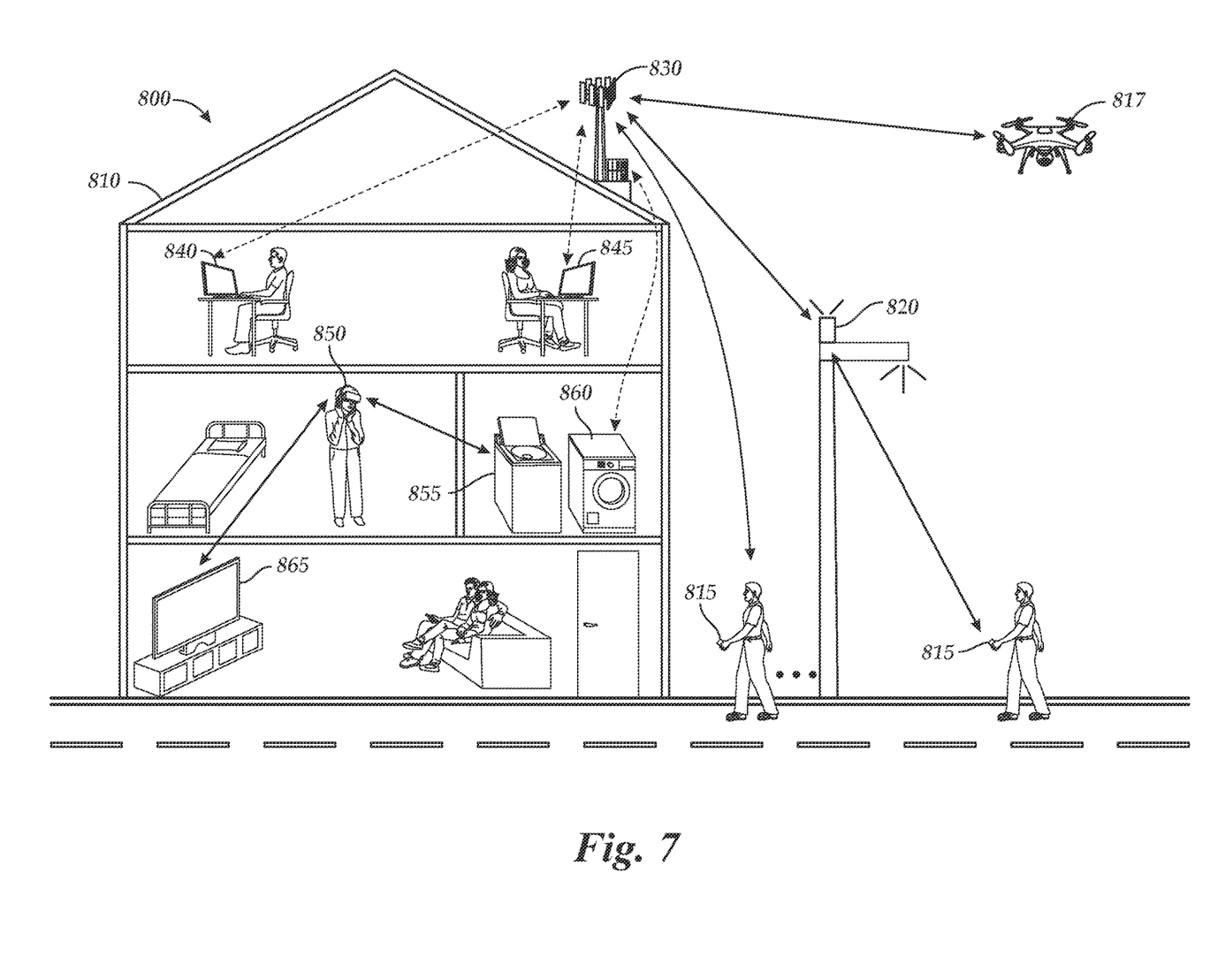

FIG. 7 illustrates an example of a wireless communications system 800 in accordance with aspects of the present disclosure. System 800 may include a mobile device 815, a drone 817, a communication device 820, and a small cell 830. Building 810 may also include devices of the wireless communications system 800 that may be configured to communicate with other elements in the building 810 or small cell 830. Building 810 may also include networked workstations 840, 845, virtual reality device 850, IoT devices 855, 860, and networked entertainment device 865. In the depicted wireless communications system 800, IoT devices 855, 860 may be a washer and dryer, respectively, for residential use, being controlled by the virtual reality device 850. Accordingly, while the user of the virtual reality device 850 may be in different room of the building 810, the user may control an operation of the IoT device 855, such as configuring a washing machine setting. Virtual reality device 850 may also control the networked entertainment device 865. For example, virtual reality device 850 may broadcast a virtual game being played by a user of the virtual reality device 850 onto a display of the networked entertainment device 865.

Small cell 830 or any of the devices of building 810 may be connected to a network that provides access to the Internet and traditional communication links. Like the system 700, the wireless communications system 800 may facilitate a wide-range of wireless communications connections in a 5G system that may include various frequency bands, including but not limited to: a sub-6 GHz band (e.g., 700 MHz communication frequency), mid-range communication bands (e.g., 2.4 GHz), and mmWave bands (e.g., 24 GHz). Additionally or alternatively, the wireless communications connections may support various modulation schemes as described above with reference to system 700. Wireless communications system 800 may operate and be configured to communicate analogously to system 700. Accordingly, similarly numbered elements of wireless communications system 800 and system 700 may be configured in an analogous way, such as communication device 720 to communication device, small cell 730 to small cell 830, etc.

Like the system 700, where elements of system 700 are configured to form independent hierarchal or ad-hoc networks, communication device 820 may form a hierarchal network with small cell 830 and mobile device 815, while an additional ad-hoc network may be formed among the small cell 830 network that includes drone 817 and some of the devices of the building 810, such as networked workstations 840, 845 and IoT devices 855, 860. Devices in wireless communications system 800 may also form (D2D) connections with other mobile devices or other elements of the wireless communications system 800. For example, the virtual reality device 850 may form a narrowband IoT connections with other devices, including IoT device 855 and networked entertainment device 865. Like system 700, data transfer between devices in system 800 may be implemented using one of the standards mentioned above such as CCIX, Gen-Z, or other standards. When the system is implemented in aforementioned embodiments with reference to FIGS. 1-5, devices may share a coherent memory space, eliminating the need for transferring sensor data on each mobile device to a local memory of another device.

Returning to the example in FIG. 7, a configurable logic block network (e.g., 300 in FIG. 3) may be implemented in a system that may be located inside the house 810 or on a server in a cloud computing network. An application is running on the virtual reality device 850 and may be configured to display a visual representation of the IoT device 860 so that the user can enjoy the interactive game on the virtual reality device without walking out of the room. For example, the IoT device 860 is a dryer and has one or more sensors that capture the level of dryness in the dryer and other operating information of the dryer. Instead of the dryer constantly transmitting the sensor data to a server or cloud, the sensor data are stored in a shared memory space in the dryer. Each of the virtual reality device 850 and the IoT device 860 is compliant with a standard, such as CCIX, Gen-Z, or other standards that would allow both devices to share a coherent shared memory space. In such a case, each of the virtual reality device 850 and IoT device 860 may be an attached memory device (330 in FIG. 3). In addition, each device may also have one or more processing elements for implementing some applications.

Continuing with the above example, the application running on the virtual reality device 850 may need to retrieve the sensor data from the IoT device 860. In doing so, a control logic unit of the network (e.g., 320 in FIG. 3) may generate one or more commands that contain a memory address pointing to a memory portion of the IoT device 860, which allows the application to directly access sensor data captured by the IoT device 860 in a memory operation. Responsive to retrieving the sensor data, the application may display a visual representation of the IoT device 860, such as drying status (e.g., a percentage bar or an icon) on a display of the virtual reality device 850, thereby updating the user of the virtual reality device 850 as to a status of the user's clothes in the IoT device 860.

Certain details are set forth above to provide a sufficient understanding of described embodiments. However, it will be clear to one skilled in the art that embodiments may be practiced without additional particular details. The description herein, in connection with the appended drawings, describes example configurations and does not represent all the examples that may be implemented or that are within the scope of the claims. The terms "exemplary" and "example" as may be used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Techniques described herein may be used for various wireless communications systems, which may include multiple access cellular communication systems, and which may employ code division multiple access (CDMA), time division multiple access (TDMA), frequency division multiple access (FDMA), orthogonal frequency division multiple access (OFDMA), or single carrier frequency division multiple access (SC-FDMA), or any a combination of such techniques. Some of these techniques have been adopted in or relate to standardized wireless communication protocols by organizations such as Third Generation Partnership Project (3GPP), Third Generation Partnership Project 2 (3GPP2) and IEEE. These wireless standards include Ultra Mobile Broadband (UMB), Universal Mobile Telecommunications System (UMTS), Long Term Evolution (LTE), LTE-Advanced (LTE-A), LTE-A Pro, New Radio (NR), IEEE 802.11 (WiFi), and IEEE 802.16 (WiMAX), among others.

The various illustrative blocks and modules described in connection with the disclosure herein may be implemented or performed with a general-purpose processor, a digital signal DSP, an FPGA, an application-specific integrated circuit (ASIC), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

Various functions described herein may be implemented in hardware, software executed by a processor, firmware, or any combination thereof. If implemented in software (e.g., in the case of the methods described herein), the functions may be stored on or transmitted over as one or more instructions or code on a computer-readable medium. Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), or optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

From the foregoing it will be appreciated that, although specific embodiments of the present disclosure have been described herein for purposes of illustration, various modifications may be made without deviating from the spirit and scope of the present disclosure. The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus comprising:
a first logic circuit comprising an algorithmic logic unit (ALU) and an input/output (I/O) interface coupled to the ALU, the first logic circuit configured to:
determine, based on a command associated with the first logic circuit, a first function and a second function different from the first function, wherein the first function and the second function are associated with operations performed using data retrieved from a memory associated with the first logic circuit;
implement, by the ALU, the first function using the data to generate a result; and
transmit an instruction at least partially based on the command to a second logic circuit via the I/O interface, wherein the instruction is configured to cause the second logic circuit to implement the second function using the result;
a control logic containing an instruction set and configured to generate the command associated with the first logic circuit, wherein the command includes an operation type portion indicating an operation type, a module number portion indicating a processing element to perform an operation, a memory address portion indicating a memory address for the data, and a tag portion;
an advanced extensible interface (AXI) configured to receive, from the ALU, an output data stream associated with implementation of the first function using the data to generate the result and convert the output data stream to AXI transactions; and
a memory mapping unit configured to align out-of-order packets based on the tag portion of the command and configured to receive the AXI transactions and identify the memory from a plurality of memories based at least in part on the AXI transactions.

2. The apparatus of claim 1, wherein the control logic is further configured to cause the first logic circuit to access a memory portion of a shared memory device.

3. The apparatus of claim 2, wherein the first logic circuit includes the memory mapping unit, and wherein the memory mapping unit is configured to provide the memory portion of the shared memory device.

4. The apparatus of claim 3, wherein the first logic circuit includes a device controller configured to communicate with the memory mapping unit of the first logic circuit to retrieve the memory portion of the shared memory device.

5. The apparatus of claim 3, wherein the memory mapping unit is configured to map a memory address portion of the shared memory device.

6. The apparatus of claim 5, wherein the memory mapping unit is configured to receive the memory address portion of the shared memory device with the command.

7. The apparatus of claim 1, wherein the first logic circuit includes a device manager configured to read data from or write data to a memory portion of a shared memory device.

8. The apparatus of claim 1, wherein the control logic is configured to generate the command based on a second instruction.

9. The apparatus of claim 8, further comprising an input/output (I/O) block configured to receive the second instruction from an application.

10. The apparatus of claim 1, further comprising the second logic circuit configured to:
receive the instruction from the first logic circuit via an interconnect;
determine the second function from a received instruction; and
implement, by an ALU of the second logic circuit, the second function.

11. The apparatus of claim 1, wherein the AXI is configured to use a direct memory access (DMA) engine to convert the output data stream to the AXI transactions.

12. The apparatus of claim 1, wherein the AXI is configured to retrieve data from the memory as AXI read data and convert the AXI read data to input data streams.

13. A method comprising:
  generating, by a control logic of a configurable logic block network, a command associated with a first logic circuit, wherein the command includes an operation type portion indicating an operation type, a module number portion indicating a processing element to perform an operation, a memory address portion indicating a memory address for data, and a tag portion;
  determining, at the first logic circuit, a first function and a second function different from the first function based on the command associated with the first logic circuit, wherein the first function and the second function are associated with operations performed using the data retrieved from a memory associated with the first logic circuit;
  converting, by an advanced extensible interface (AXI), an output data stream received from an algorithmic logic unit (ALU) of the first logic circuit to AXI transactions, wherein the output data stream is associated with implementation of the first function by the ALU;
  identifying, by a memory mapping unit and based on the AXI transactions, the memory from a plurality of memories;
  aligning, by the memory mapping unit and based on the tag portion of the command, at least two out-of-order packets included in the data;
  implementing, by the ALU of the first logic circuit, the first function using the data to generate a result; and
  transmitting an instruction at least partially based on the command to a second logic circuit via an input/output (I/O) interface, wherein the instruction is configured to cause the second logic circuit to implement the second function using the result.

14. The method of claim 13, further comprising generating, by the control logic, the command associated with a first logic circuit based on a second instruction.

15. The method of claim 14, further comprising receiving, via an input/output (I/O) block of the configurable logic block network, the second instruction.

16. The method of claim 13, further comprising causing, via the control logic, the first logic circuit to access a memory portion of a shared memory device.

17. The method of claim 16, further comprising providing, via the memory mapping unit, the memory portion of the shared memory device.

18. The method of claim 17, further comprising, communicating, via a device controller of the logic circuit, with the memory mapping unit of the respective logic circuit to retrieve the memory portion of the shared memory device.

19. The method of claim 17, further comprising, mapping, via the memory mapping unit, a memory address portion of the shared memory device.

20. The method of claim 19, further comprising receiving, at the memory mapping unit, the memory address portion of the shared memory device with the command.

21. The method of claim 13, further comprising, reading data from or writing data to a memory portion of a shared memory device via a device manager of the logic circuit.

22. The method of claim 13, further comprising:
  receiving, at the second logic circuit, the instruction from the first logic circuit via an interconnect;
  determining the second function from a received instruction; and
  implementing, by an ALU of the second logic circuit, the second function.

* * * * *